(12) United States Patent
Rodriquez et al.

(10) Patent No.: US 9,385,903 B2
(45) Date of Patent: Jul. 5, 2016

(54) RHOMBIC-QPSK MODULATION FOR IMPROVED TOLERANCE TO NONLINEARITY IN FIBER COMMUNICATION SYSTEMS

(71) Applicant: NEC Laboratories America, Inc., Princeton, NJ (US)

(72) Inventors: Eduardo Mateo Rodriquez, Tokyo (JP); Fatih Yaman, Monmouth Junction, NJ (US); Shaoliang Zhang, Princeton, NJ (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/456,427

(22) Filed: Aug. 11, 2014

(65) Prior Publication Data

US 2015/0043680 A1 Feb. 12, 2015

Related U.S. Application Data

(60) Provisional application No. 61/864,728, filed on Aug. 12, 2013.

(51) Int. Cl.
*H04L 27/20* (2006.01)
*H04L 25/03* (2006.01)

(52) U.S. Cl.
CPC *H04L 27/2067* (2013.01); *H04B 2201/709709* (2013.01); *H04L 25/03343* (2013.01)

(58) Field of Classification Search
CPC .............. H04L 25/03343; H04B 2201/709709

USPC .......... 375/242, 324, 340, 348, 308; 329/304, 329/349, 353
See application file for complete search history.

(56) References Cited

PUBLICATIONS

Lu et al., "Rectangular QPSK for generation of optical eight-ary phase-shift keying" Optics Express, vol. 19, Issue 19, pp. 18479-18485 (2011).*
C. Laperle et al., "Wavelength Division Multiplexing (WDM) and Polarization Mode Dispersion (PMD) Performance of a Coherent 40Gbit/s Dual-Polarization Quadrature Phase Shift Keying (DP-QPSK) Transceiver" Optical Fiber Communication Conference and Exposition and the National Fiber Optical Engineers Conference Paper PDP16 (, 2007).
C.R.S. Fludger et al., "Coherent Equalization and POLMUX-RZ-DPQSK for Robust 100-GE Transmission" Journal of Lightwave Technology 26:64-72 (, 2008).
R.A. Griffin et al., "Optical Differential Quadrature Phase-Shift Key (oDQPSK) for High Capacity Optical Transmission" Optical Fiber Communication Conference and Exhibit:367-368 (Mar. 17-22, 2002).
A. Bononi et al., "Cross-Phase Modulation Induced by OOK Channels on Higher-Rate DQPSK and Coherent QPSK Channels" Journal of Lightwave Technology 27:2974-2983 (, 2009).

* cited by examiner

*Primary Examiner* — Leila Malek
(74) *Attorney, Agent, or Firm* — Joseph Kolodka

(57) ABSTRACT

This invention proposes an alternative modulation format for channels that present improved performance when such channels co-propagate with existing intensity modulated channels. This modulation format is named Rhombic-QPSK (R-QPSK) and it is designed in such a way that it presents more tolerance to phase noise created by the nonlinear interaction with the legacy channels.

11 Claims, 4 Drawing Sheets

301: Driver Amplifier for I component
302: Driver Amplifier for Q component
303: Mach-Zehnder Modulator for I component
304: Mach-Zehnder Modulator for Q component
305: Phase shifter
306: Laser source

RHOMBIC-QPSK MODULATION FOR IMPROVED TOLERANCE TO NONLINEARITY IN FIBER COMMUNICATION SYSTEMS

RELATED APPLICATION INFORMATION

This application claims priority to provisional application No. 61/864,728 filed Aug. 12, 2013, entitled "Rhombic-QPSK Modulation for Improved Tolerance to Nonlinearity in Fiber Communication Systems with Co-Propagating Intensity-Modulated Channel", the contents thereof are incorporated herein by reference

BACKGROUND OF THE INVENTION

The present invention relates generally to optics, and more particularly, to rhombic-QPSK (quadrature phase shift key) modulation for improved tolerance to nonlinearity in fiber communication systems with co-propagating intensity-modulated channel.

The following references are discussed in this application for background information or improved understanding of existing knowledge.

[1] Alberto Bononi, Marco Bertolini, Paolo Serena, and Giovanni Bellotti, "Cross-Phase Modulation Induced by OOK Channels on Higher-Rate DQPSK and Coherent QPSK Channels," J. Lightwave Technol. 27, 3974-3983 (2009).

[2] Griffin, R. A.; Carter, A. C.; "Optical differential quadrature phase-shift key (oDQPSK) for high capacity optical transmission," *Optical Fiber Communication Conference and Exhibit,* 2002. OFC 2002, vol., no., pp. 367-368, 17-22 Mar. 2002.

[3] Chris R. S. Fludger, Thomas Duthel, Dirk van den Borne, Christoph Schulien, Ernst-Dieter Schmidt, Torsten Wuth, Jonas Geyer, Erik De Man, Giok-Djan Khoe, and Huug de Waardt, "Coherent Equalization and POLMUX-RZ-DQPSK for Robust 100-GE Transmission," J. Lightwave Technol. 26, 64-72 (2008).

[4] C. Laperle, B. Villeneuve, Z. Zhang, D. McGhan, H. Sun, and M. O'Sullivan, "Wavelength Division Multiplexing (WDM) and Polarization Mode Dispersion (PMD) Performance of a Coherent 40 Gbit/s Dual-Polarization Quadrature Phase Shift Keying (DP-QPSK) Transceiver," in *Optical Fiber Communication Conference and Exposition and The National Fiber Optic Engineers Conference*, OSA Technical Digest Series (CD) (Optical Society of America, 2007), paper PDP16.

Future optical transmission technologies involve the utilization of high-order modulation formats to cope with bit-rates per channel of 100 Gb/s and beyond. The most popular solution for 100 Gb/s systems is DP-QPSK (Dual-Polarization Quadrature-Phase-Shift-Keying).

Most of the existing fiber links use 10 Gb/s intensity-modulated (IM) channels. In order to increase the information capacity of an existing fiber link without interrupting existing traffic, new high-speed 100 Gb/s can be added to the link without removing the existing "old" channels. This is a cost efficient solution which permits increasing information capacity without needing to install new fiber cables.

However, 100 G DP-QPSK channels are heavily impaired by the existing co-propagating intensity-modulated channels through fiber nonlinear effects. This strongly limits the performance and transmission reach of this mixed rate links.

Typical solutions to reduce the nonlinear interactions between existing IM channels and new high speed QPSK channels involve adding a frequency guard band between them. Other solution is to reduce the modulation order to (for example) BPSK. This has the disadvantage of reducing spectral efficiency.

Accordingly, there is a need for an alternative modulation format for 100 G channels that present improved performance when such channels co-propagate with existing IM channels.

BRIEF SUMMARY OF THE INVENTION

The invention is directed a method for
In a similar aspect of the invention there is provided a non-transitory storage medium configured with instructions to be implemented by a computer for carrying out These and other advantages of the invention will be apparent to those of ordinary skill in the art by reference to the following detailed description and the accompanying drawings.

DETAILED DESCRIPTION

The present invention is directed to a an alternative modulation format for 100 G channels that present improved performance when such channels co-propagate with existing IM channels. This modulation format is named Rhombic-QPSK (R-QPSK) and it is configured in such a way that it presents more tolerance to phase noise created by the nonlinear interaction with the legacy channels.

Figure 1:
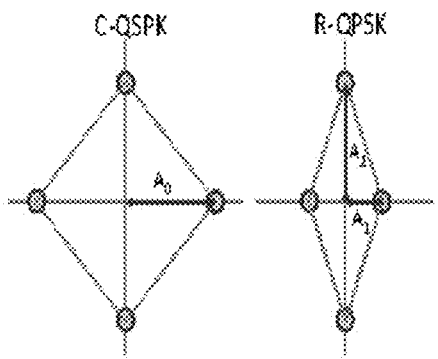
FIG. 1 is a diagram depicting constellation diagrams for conventional QPSK and the inventive rhombic QPSK.

Referring to FIG. 1, there shown constellation diagrams for conventional quadrature phase shift key C-QPSK and the inventive rhombic quadrature phase shift key R-QPSK systems.

Conventional QPSK (C-QPSK) is a constant-amplitude constellation where information is encoded in 4 possible phase values $(0, \pm\pi/2, \pi)$, all the points in the constellation have the same amplitude $A_0$. Rhombic QPSK (R-QSPK) is a dual-amplitude modulation with four phase values $(0, \pm\pi/2, \pi)$, where $(0, \pi)$ have amplitude $A_1$ and $(\pi/2, -\pi/2)$ have amplitude $A_2$. FIG. 1 shows C-QPSK and R-QPSK constellations.

For C-QPSK, data is recovered by making decisions based on the phase of the constellation points. Alternatively, in with the inventive R-QPSK data is recovered by making decisions in both phase and amplitude of the constellation points. This has bit-error-rate advantage in systems with strong phase noise induced by co-propagating IM channels. This invention is two-folded. First, the Rhombic-QPSK is implemented by choosing an optimum ratio between $A_1$ and $A_2$. Second, an optimum de-mapping method is proposed to maximize system performance. C-QPSK is the optimum constellation is a communication channel with Gaussian noise. However, by optimizing the decision method together with the amplitudes $A_1$, $A_2$ the performance of R-QPSK can be superior to C-QPSK in links with co-propagating IM channels.

To explain the physics behind our invention, let us consider a QPSK constellation degraded by the co-propagation of IM channels. In legacy optical links, such distortion is mainly accumulated in the phase of the symbols [1]. In C-QPSK, de-mapping of symbols is made by making decisions based only on the phase of the symbols. Therefore, if the phase distortion is larger than $\pi/4$, symbols carrying different bits will overlap and an error will occur. In R-QPSK, we can use the different amplitude of the symbols to perform the de-mapping. Now, even when the phase distortion accumulated by one symbol in the constellation is larger than $\pi/4$, we can still look at their amplitude value to decide which pair of bits to assign. By choosing the decision boundaries carefully (both in terms of phase an amplitude), we can reduce the bit error rate of the system when the distortion is dominated by phase distortion.

Figure 2:
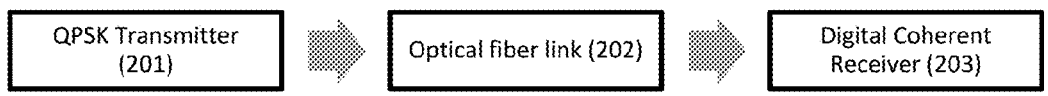
FIG. 2 is a diagram showing an optical communication system with QPSK and a digital coherent receiver.

In FIG. 2, there is shown a block diagram of a fiber communication system with coherent detection. For simplicity we will consider a system with single polarization and single channel. However, this invention also naturally extends to polarization-division multiplexing and wavelength division multiplexing.

Figure 3:
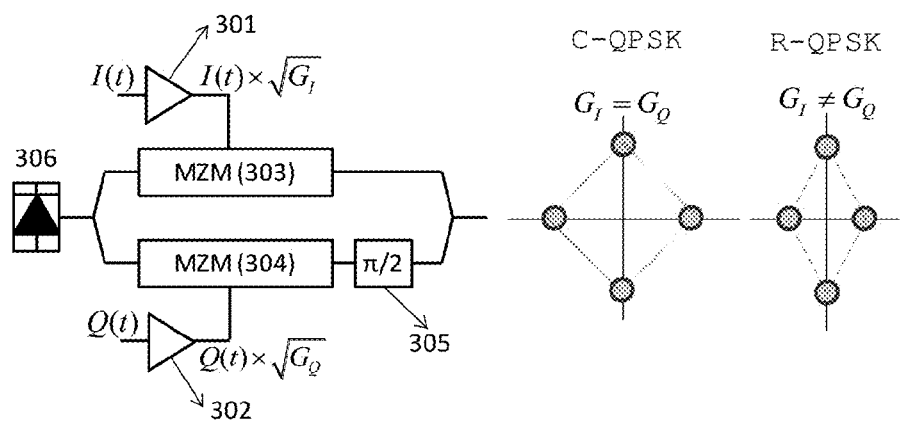
FIG. 3 is a diagram showing a QPSK modulator using two MZMs.

The QPSK transmitter is typically implemented by using a nested Mach-Zehnder modulators and a phase shifter [2,3]. The diagram of FIG. 3 shows a typical implementation of the QPSK transmitter 201.

By choosing the gain of the driver amplifiers (301, 302) one can generate both C-QPSK and R-QPSK constellations. In particular, C-QPSK is generated when the gain provided to I(t) by amplifier (301), i.e $G_I$ is equal to the gain provided to Q(t) by amplifier (302), i.e $G_Q$. If the gains are different, then a rhombic constellation can be generated. The ratio between diagonals $A_1$ and $A_2$ depends on the ratio between $G_I$ and $G_Q$.

Figure 4:
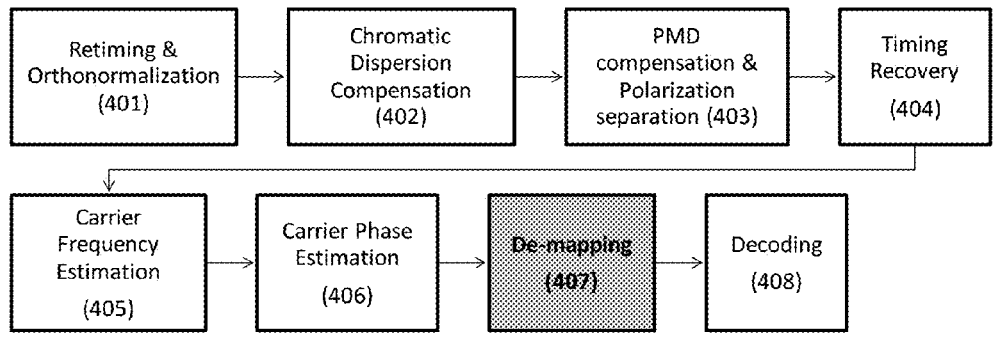
FIG. 4 is a diagram of typical digital signal processing stages DSP of a digital coherent receiver.

A conventional coherent receiver can be used to detect an R-QPSK signal [3]. The only difference with respect to the C-QPSK is on the de-mapping stage. FIG. 4 shows the typical stages of digital signal processing corresponding to the coherent detection of a QPSK signal [3]. Again, for simplicity we are assuming single polarization transmission, but this invention applies by simple extension, to polarization multiplexed systems, where two independent R-QPSK signals are generated, and combined using a polarization rotator and polarization beam combiner [4].

Referring now to the diagram of FIG. 4, typical digital signal processing stages of a digital coherent receiver are shown. Among all the stages of FIG. 4, only stage (407) is modified when R-QPSK is used instead of C-QPSK. All the remaining stages, 401-406 and 408, are assumed to be the conventional DSP operations to recover a QPSK signal. This invention, includes a new de-mapping method that reduces the bit-error rate (BER) when R-QPSK is used.

The generation of R-QPSK and the specific de-mapping table are the key points of this invention.

In order to explain the de-mapping method, let us assume a distorted constellation with phase noise induced by IM channels [1].

Figure 5:
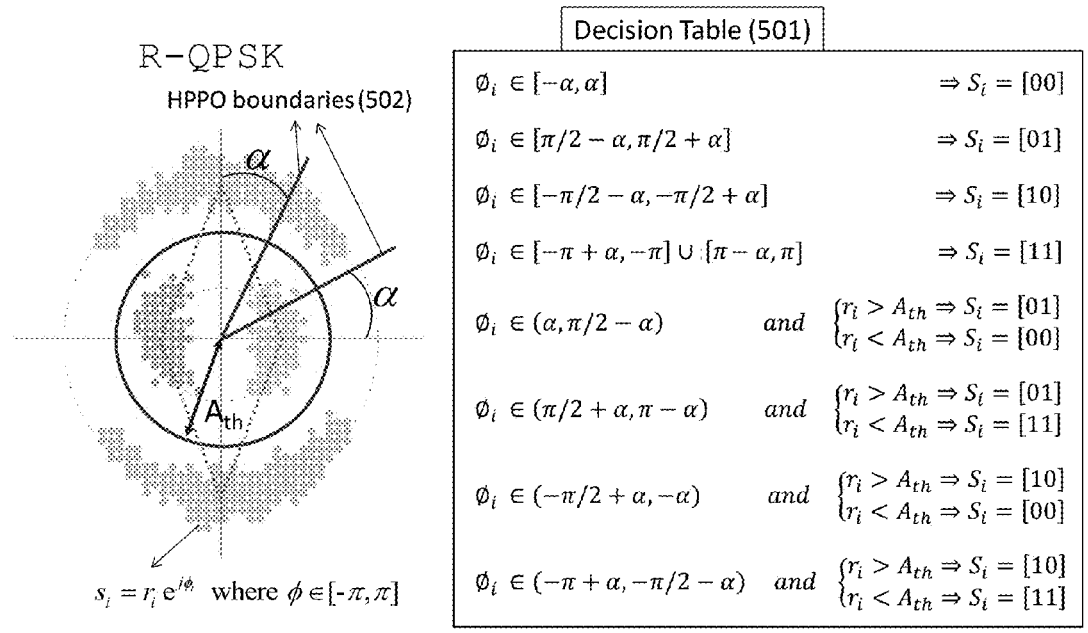
FIG. 5 is a diagram showing a constellation of the inventive rhombic-quadrature phase shift keying (R-QPSK).

FIG. 5 shows a constellation where the scattered points represent the received QPSK symbols, $s_i = r_i e^{j\phi_i}$, where S denotes a symbol, $\phi$ denotes phase, r denotes amplitude or radius in the constellation, j denotes conjugate, and i denotes a particular value of a symbol, amplitude or phase. Each symbol carries two bits of information and the de-mapping stage assigns a pair of bits to each symbol depending on their location in the constellation. For R-QPSK, we propose to use the decision table (501) shown in FIG. 5. Such table takes into account not only the phase of the symbols (typical decision in C-QPSK) but also their amplitude. Our table is based on two assumptions: First, in the regions of the constellation with high probability of phase overlapping (HPPO), decisions are made based on the amplitude. Second, in regions with low probability of phase overlapping, decisions are made based on the phase. This is the general idea of the invention.

In order to mathematically implement the concept, different approaches could be considered. We decided to use the one shown in FIG. 5 and defined by table 501. Here, each quadrant has an area of HPPO, which depends of the angle $\alpha$. As shown in the figure, the point in the constellation within the HPPO boundaries (502) is de-mapped according to its amplitude. Depending whether the amplitude is larger or smaller than an amplitude threshold $A_{th}$, the de-mapping decision will be different. The de-mapping table depends on two optimization parameters, namely the angle $\alpha$ and the amplitude threshold $A_{th}$. Both parameters are optimized according to the transmission link and the values of the diagonals $A_1$ and $A_2$. Their optimum values are the ones that minimize the BER. It is interesting to note that table 501 can be used for C-QPSK just by setting $\alpha=0$.

Figure 6:
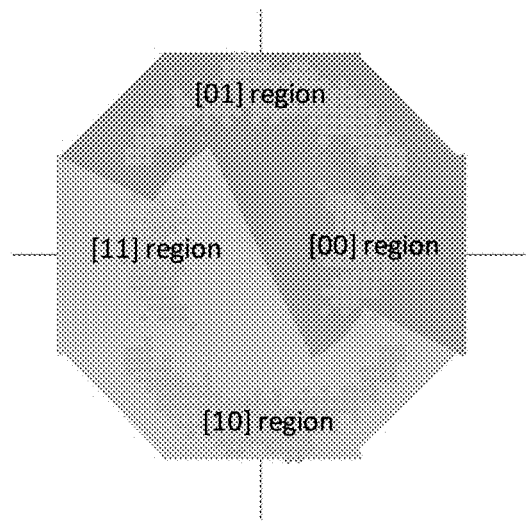
FIG. 6 shows a diagram representation of different de-mapping regions for the inventive R-QPSK.

FIG. 6 illustrates the different decision regions corresponding to the relations shown in the decision table (501).

Figure 7:
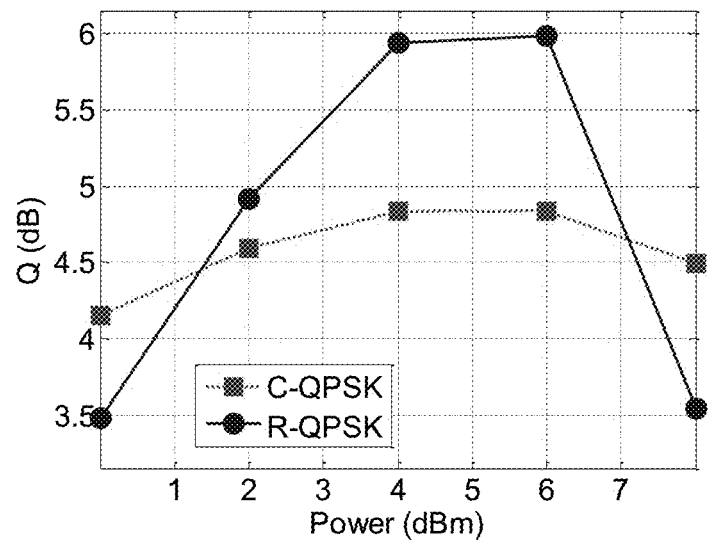
FIG. 7 is a diagram comparing C-QPSK and R-QPSK performances.

Referring now to FIG. 7, there is a diagram comparing C-QPSK and R-QPSK performances. The simulation graphs of FIG. 7 show the performance improvement obtained by using R-QPSK compared to C-QPSK. This simulation considers a legacy high-loss link of 600 km with 29 dB loss per span. The dispersion is 2 ps/km/nm and it is compensated at every span by matching DCF. One 100 G (C,R)-QPSK is propagated together with 100 GHz spaced 10.7 Gb/s NRZ-OOK channels with a power/channel of 0 dBm.

As expected, when power is low, C-QPSK performs because the system is in the linear regime and it is limited by ASE noise. However, as power increases, the system becomes limited by XPM phase noise and R-QPKS outperform C-QPSK more than 1 dB on the Q-factor (obtained from error counting).

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 8:
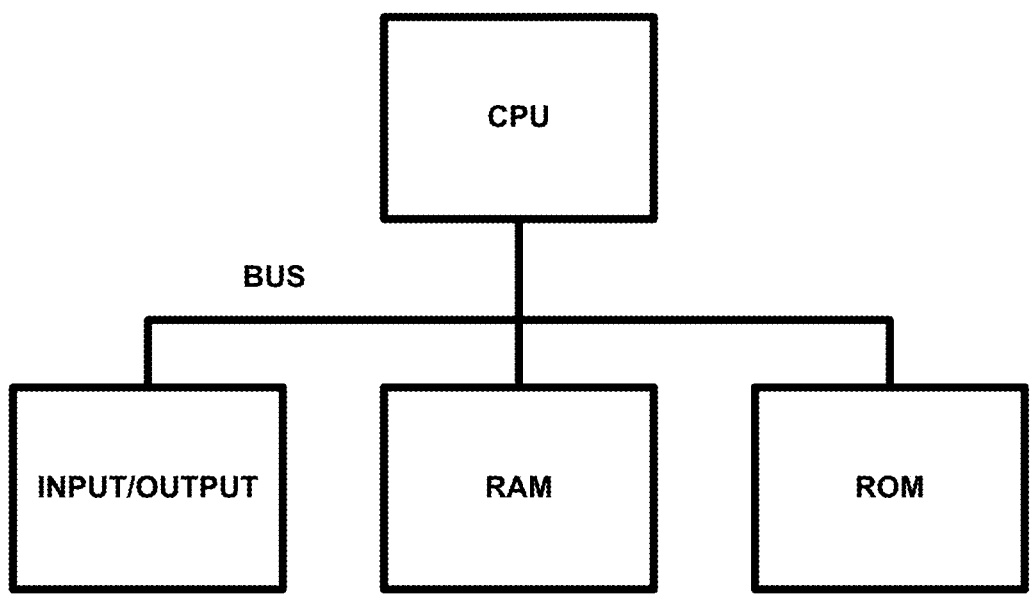
FIG. 8 shows an exemplary computer to perform the inventive cyclic decoding of cascaded FEC codes.

By way of example, a block diagram of a computer to support the system is discussed next in FIG. 8. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides the competitive value of iterative decoding among TCM decoder and LDPC decoder would enhance the coding correction performance overall. The presence of TCM could also fully re-utilize the existing hardware platform (100 G transponder) without modifying the hardware and optics, thus reducing the cost for re-designing new transponder. The LDPC code could be either binary or non-binary, thus making our scheme more generic to flexible system design. The TCM decoder could make the transition of "water-fall" of LDPC coding correction faster, thus achieving higher coding gain. Meanwhile, at the "water-fall" regime of the TCM coding performance, the number of iterations in the LDPC decoder could be significantly reduced to have less complexity. The presence of IL would help to mitigate the burst errors caused by the channels.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for communicating an information signal comprising the step of:
   modulating an information signal with a rhombic-quadrature phase shift key R-QPSK modulation format, the R-QPSK modulation being a dual amplitude modulation where the information signal is encoded with four phase values where phase values 0 and $\pi$ have a first amplitude A1 and phase values $\pi/2$ and $-\pi/2$ have an amplitude A2, data recovery of the R-QPSK modulated information signal being responsive to decisions made in both phase and amplitude of the R-QPSK modulated information signal; and
   applying the R-QPSK modulation to a fiber communication system with co-propagating intensity-modulated channel for improved tolerance to nonlinearity, wherein, in regions of the constellation with high probability of phase overlapping (HPPO), demodulating decisions are made based on the amplitude and in regions with low probability of phase overlapping, decisions on received QPSK symbols, $s_i = r_i e^{j\Phi_i}$, where S denotes a symbol, $\phi$ denotes phase, r denotes amplitude or radius in the constellation, j denotes conjugate, and i denotes a particular value of a symbol, amplitude or phase, are made based on the phase with angle $\alpha$ and amplitude threshold $A_{th}$ with a decision table $$\phi_i \in [-\alpha, \alpha] \Rightarrow S_i = [00]$$

$$\phi_i \in [\pi/2 - \alpha, \pi/2 + \alpha] \Rightarrow S_i = [01]$$

$$\phi_i \in [-\pi/2 - \alpha, -\pi/2 + \alpha] \Rightarrow S_i = [10]$$

$$\phi_i \in [-\pi + \alpha, -\pi] \cup [\pi - \alpha, \pi] \Rightarrow S_i = [11]$$

$$\phi_i \in (\alpha, \pi/2 - \alpha) \quad \text{and} \quad \begin{cases} r_i > A_{th} \Rightarrow S_i = [01] \\ r_i < A_{th} \Rightarrow S_i = [00] \end{cases}$$

$$\phi_i \in (\pi/2 + \alpha, \pi - \alpha) \quad \text{and} \quad \begin{cases} r_i > A_{th} \Rightarrow S_i = [01] \\ r_i < A_{th} \Rightarrow S_i = [11] \end{cases}$$

$$\phi_i \in (-\pi/2 + \alpha, -\alpha) \quad \text{and} \quad \begin{cases} r_i > A_{th} \Rightarrow S_i = [10] \\ r_i < A_{th} \Rightarrow S_i = [00] \end{cases}$$

$$\phi_i \in (-\pi + \alpha, -\pi/2 - \alpha) \quad \text{and} \quad \begin{cases} r_i > A_{th} \Rightarrow S_i = [10] \\ r_i < A_{th} \Rightarrow S_i = [11] \end{cases}.$$

2. The method of claim 1, wherein the R-QPSK modulation is implemented by choosing a desired ratio between amplitudes A1 and A2.

3. The method of claim 1, wherein the R-QPSK modulation of the information signal provides tolerance to phase noise from interaction with other signals having a different modulation format.

4. The method of claim 1, wherein the R-QPSK modulation of the information signal enables use of the amplitude A1 and A2 values when phase noise affects the phase values to decide which pair of bits to assign thereby enabling reduction bit error rate in a communication system where distortion is dominated by phase distortion.

5. The method of claim 1, comprising de-mapping of received symbols of the R-QPSK modulation comprises each symbol carrying two bits of information and the de-mapping assigning a pair of bits to each symbol depending on their location in a constellation of the R-QPSK modulation.

6. A non-transitory storage medium configured with instructions to be implemented by a computer for carrying out the following steps:
   modulating an information signal with a rhombic-quadrature phase shift key R-QPSK modulation format, the R-QPSK modulation being a dual amplitude modulation where the information signal is encoded with four phase values where phase values 0 and $\pi$ have a first amplitude A1 and phase values $\pi/2$ and $-\pi/2$ have an amplitude A2, data recovery of the R-QPSK modulated information signal being responsive to decisions made in both phase and amplitude of the R-QPSK modulated information signal; and
   applying the R-QPSK modulation to a fiber communication system with co-propagating intensity-modulated channel for improved tolerance to nonlinearity,
   wherein, in regions of the constellation with high probability of phase overlapping (HPPO), demodulating decisions are made based on the amplitude and in regions with low probability of phase overlapping, decisions on received QPSK symbols, $s_i = r_i e^{j\Phi_i}$ $s_i = r_i e^{j\Phi_i}$, where S denotes a symbol, $\phi$ denotes phase, r denotes amplitude or radius in the constellation, j denotes conjugate, and i denotes a particular value of a symbol, amplitude or phase, are made based on the phase with angle $\alpha$ and amplitude threshold $A_{th}$ with a decision table $\phi_i \in [-\alpha, \alpha] \Rightarrow S_i = [00]$ $\phi_i \in [\pi/2 - \alpha, \pi/2 + \alpha] \Rightarrow S_i = [01]$ $\phi_i \in [-\pi/2 - \alpha, -\pi/2 + \alpha] \Rightarrow S_i = [10]$ $\phi_i \in [-\pi + \alpha, -\pi] \cup [\pi - \alpha, \pi] \Rightarrow S_i = [11]$ $\phi_i \in (\alpha, \pi/2 - \alpha)$ and $\begin{cases} r_i > A_{th} \Rightarrow S_i = [01] \\ r_i < A_{th} \Rightarrow S_i = [00] \end{cases}$ $\phi_i \in (\pi/2 + \alpha, \pi - \alpha)$ and $\begin{cases} r_i > A_{th} \Rightarrow S_i = [01] \\ r_i < A_{th} \Rightarrow S_i = [11] \end{cases}$ $\phi_i \in (-\pi/2 + \alpha, -\alpha)$ and $\begin{cases} r_i > A_{th} \Rightarrow S_i = [10] \\ r_i < A_{th} \Rightarrow S_i = [00] \end{cases}$ $\phi_i \in (-\pi + \alpha, -\frac{\pi}{2} - \alpha)$ and $\begin{cases} r_i > A_{th} \Rightarrow S_i = [10] \\ r_i < A_{th} \Rightarrow S_i = [11] \end{cases}$.

7. The non-transitory storage medium of claim 6, wherein the R-QPSK modulation is implemented by choosing a desired ratio between amplitudes A1 and A2.

8. The non-transitory storage medium of claim 6, wherein the R-QPSK modulation of the information signal provides tolerance to phase noise from interaction with other signals having a different modulation format.

9. The non-transitory storage medium of claim 6, wherein the R-QPSK modulation of the information signal enables use of the amplitude A1 and A2 values when phase noise affects the phase values to decide which pair of bits to assign thereby enabling reduction bit error rate in a communication system where distortion is dominated by phase distortion.

10. The non-transitory storage medium of claim 6, comprising de-mapping of received symbols of the R-QPSK modulation comprises each symbol carrying two bits of information and the de-mapping assigning a pair of bits to each symbol depending on their location in a constellation of the R-QPSK modulation.

11. The non-transitory storage medium of claim 6, wherein a decoding of the R-QPSK modulated information signal being based on both 1) regions of a constellation with high probability of phase overlapping encompass decisions being made based on the amplitude of the R-QPSK signal and 2) regions in the constellation with low probability of phase overlapping encompass decisions being made based on the phase of the R-QPSK signal.

* * * * *